(12) United States Patent
Isobe et al.

(10) Patent No.: US 8,393,793 B2
(45) Date of Patent: Mar. 12, 2013

(54) SENSOR-EQUIPPED BEARING FOR WHEEL

(75) Inventors: Hiroshi Isobe, Iwata (JP); Kentarou Nishikawa, Iwata (JP); Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 298 days.

(21) Appl. No.: 12/734,826

(22) PCT Filed: Nov. 20, 2008

(86) PCT No.: PCT/JP2008/003398
§ 371 (c)(1),
(2), (4) Date: May 26, 2010

(87) PCT Pub. No.: WO2009/069267
PCT Pub. Date: Jun. 4, 2009

(65) Prior Publication Data
US 2010/0303394 A1 Dec. 2, 2010

(30) Foreign Application Priority Data

Nov. 27, 2007 (JP) .................................. 2007-305300
Nov. 27, 2007 (JP) .................................. 2007-305302

(51) Int. Cl.
*F16C 19/52* (2006.01)
(52) U.S. Cl. ..................................................... 384/448
(58) Field of Classification Search .................. 384/448; 73/862.632
See application file for complete search history.

(56) References Cited

U.S. PATENT DOCUMENTS

| 4,341,122 | A |   | 7/1982 | Lechler et al. |
| 4,996,882 | A | * | 3/1991 | Kistler .................... 73/862.632 |
| 6,619,102 | B2 |  | 9/2003 | Salou et al. |
| 6,634,208 | B2 |  | 10/2003 | Salou et al. |
| 6,971,799 | B2 |  | 12/2005 | Sato et al. |
| 7,197,387 | B2 |  | 3/2007 | Inoue et al. |
| 2002/0012484 | A1 |  | 1/2002 | Salou et al. |
| 2002/0061148 | A1 |  | 5/2002 | Salou et al. |
| 2003/0218548 | A1 |  | 11/2003 | Sato et al. |

(Continued)

FOREIGN PATENT DOCUMENTS

| JP | 62-49568  | 10/1987 |
| JP | 63-256832 | 10/1988 |

(Continued)

OTHER PUBLICATIONS

U.S. Appl. No. 11/990,071, filed Feb. 6, 2008, Ozaki et al., NTN Corporation.

(Continued)

*Primary Examiner* — Thomas R Hannon

(57) ABSTRACT

A sensor-equipped wheel support bearing assembly capable of accurately detecting load acting on the vehicle wheel by reducing concentration of strain on a cutout portion corner area of a strain generating member in a sensor unit is provided. The wheel support bearing assembly having rolling elements interposed between rolling surfaces in outer and inner members, includes at least one sensor unit provided in a stationary member, which is one of the outer and inner members. The sensor unit includes a strain generating member, having two or more contact fixing segments secured to the stationary member in contact therewith, and a sensor fitted to the strain generating member for detecting a strain in the strain generating member. The strain generating member has a cutout portion between the contact fixing segments, and corner area of such cutout portion is of an arcuately sectioned shape.

10 Claims, 9 Drawing Sheets

U.S. PATENT DOCUMENTS

| | | |
|---|---|---|
| 2005/0222740 A1 | 10/2005 | Inoue et al. |
| 2009/0097791 A1 | 4/2009 | Ozaki et al. |
| 2009/0114004 A1 | 5/2009 | Ozaki et al. |
| 2010/0135604 A1 | 6/2010 | Ozaki et al. |

FOREIGN PATENT DOCUMENTS

| | | |
|---|---|---|
| JP | 4-39553 | 9/1992 |
| JP | 2002-98138 | 4/2002 |
| JP | 2003-530565 | 10/2003 |
| JP | 2004-003601 | 1/2004 |
| JP | 2004-514900 A | 5/2004 |
| JP | 2006-119000 | 5/2006 |
| JP | 2006-170352 | 6/2006 |
| JP | 2007-57299 | 3/2007 |
| JP | 2007-57302 | 3/2007 |
| JP | 2007-292158 | 11/2007 |
| WO | 01/77634 A2 | 10/2001 |
| WO | 02/44678 A1 | 6/2002 |
| WO | 2004/018273 | 3/2004 |
| WO | 2007/105367 A1 | 9/2007 |

OTHER PUBLICATIONS

International Search Report for PCT/JP2008/003398, mailed on Dec. 22, 2008.

English Translation of the International Preliminary Report on Patentability mailed Jun. 17, 2010 in corresponding International Patent Application PCT/JP2008/003398.

Chinese Office Action dated Nov. 25, 2011 issued in corresponding Chinese Patent Application No. 200880117200.8.

Chinese Office Action mailed Dec. 26, 2011 issued in a related. Chinese Patent Application No. 200980104899.9.

Chinese Office Action issued Apr. 19, 2012 in related Chinese Patent Application No. 200980104899.9.

European Search Report dated Feb. 27, 2012 issued in related European Patent Application No. 09711226.2.

U.S. Appl. No. 12/736,412, filed Dec. 23, 2010, Toru Takahashi et al., NTN Corporation.

U.S. Appl. No. 12/735,700, filed Aug. 10, 2010, Toru Takahashi et al., NTN Corporation.

International Preliminary Report on Patentability mailed Oct. 14, 2010 in a possible related International Patent Application PCT/JP2009/000524.

International Preliminary Report on Patentability mailed Dec. 9, 2010 in a possible related International Patent Application PCT/JP2009/001610.

Japanese Office Action issued Sep. 4, 2012 in correspodning Japanese Patent Application No. 2007-305302.

Chinese Office Action issued Aug. 30, 2012 in corresponding Chinese Patent Application No. 200880117200.8.

Japanese Office Action mailed Jul. 3, 2012 issued in related Japanese Patent Application No. 2008-033996.

Japanese Office Action mailed May 29, 2012 issued in corresponding Japanese Patent Application No. 2007-305300.

Japanese Office Action mailed May 29, 2012 issued in corresponding Japanese Patent Application No. 2007-305302.

* cited by examiner

SENSOR-EQUIPPED BEARING FOR WHEEL

CROSS REFERENCE TO RELATED APPLICATIONS

This application claims the benefit under 35 U.S.C. Section 371, of PCT International Application No. PCT/JP2008/003398, filed Nov. 20, 2008, which claimed priority to Japanese patent applications No. 2007-305300 and No. 2007-305302, both filed Nov. 27, 2007, the entire disclosures of which are herein incorporated by reference as a part of this application.

BACKGROUND OF THE INVENTION

1. Field of the Invention

The present invention relates to a sensor-equipped wheel support bearing assembly having a load sensor incorporated thereon for detecting a load imposed on a bearing unit employed in an automotive vehicle.

2. Description of the Related Art

As a technique for detecting a load imposed on each of vehicle wheels of an automotive vehicle, a sensor-equipped wheel support bearing assembly has been suggested, in which a sensor unit, made up of a strain generating member and a strain sensor fitted to this strain generating member, is fitted to a stationary ring of the bearing unit and in which the strain generating member has a contact fixing segments, provided at least two locations, relative to the stationary ring and also has a cutout portion, at least one location, between the neighboring contact fixing segments, with the strain sensor arranged in this cutout portion. (See, for example, the Patent Document 1 listed below.)

According to this sensor-equipped wheel support bearing assembly, when a load is imposed on a rotating ring incident to travel of the automotive vehicle, the rotating ring deforms through rolling elements and such deformation in turn brings about a strain in the sensor unit. The strain sensor provided in the sensor unit detects a strain induced in the sensor unit. If the relation between the strain and the load is determined by means of a series of experiments and/or simulations in advance, the load acting on a vehicle wheel can be detected from an output of the strain sensor.

Other than the above, as a related technique, a sensor-equipped wheel support bearing assembly has also been suggested, in which the load is detected by detecting a strain occurring in a flange outer diametric face of an outer ring of the wheel support bearing assembly that serves as a stationary ring. (See, for example, the Patent Document 2 listed below.). In addition, a wheel support bearing assembly including a strain gauge provided on an outer ring of the wheel support bearing assembly for the detection of a strain has been suggested. (See, for example, the Patent Document 3 listed below.)

[Patent Document 1] JP Laid-open Patent Publication No. 2007-057299

[Patent Document 2] JP Laid-open Patent Publication No. 2002-098138

[Patent Document 3] JP Laid-open Patent Publication No. 2003-530565

SUMMARY OF THE INVENTION

Where the strain generating member having the cutout portion such as employed in the sensor-equipped wheel support bearing assembly disclosed in the Patent Document 1 listed above, the strain tends to concentrate on a corner area of the cutout portion. For this reason, there is the possibility that a plastic deformation may occur at that corner area even when the amount of strain has not yet reached a value enough to cause a plastic deformation at a sensor mounting area where the strain sensor, which is a detector unit, is fitted. Once such plastic deformation occurs, the deformation at the stationary ring of the bearing unit will not be transmitted accurately to the sensor unit, resulting in a problem that no accurate strain measurement can be accomplished. Also, the concentration of the strain on the corner area of the cutout portion as discussed above may lead to variation in distribution of the strain at the detector unit and, therefore, there is a problem that positioning of the strain sensor will considerably affects the result of measurement.

According to the technique disclosed in the Patent Document 2 listed above, detection is made of the strain generated as a result of deformation occurring in the flange on the stationary ring. A problem has, however, been found that since slippage occurs between the flange surface and the knuckle surface in the event that a force exceeding a stationary frictional force acts, application of repeated load results in a hysteresis appearing in an output signal.

By way of example, in the event that the load acting in a certain direction relative to the wheel support bearing assembly increases, no slippage occurs at first between the stationary ring flange surface and the knuckle surface because the stationary frictional force is larger than the load, but in the event that it exceeds a certain magnitude, the stationary frictional force overcomes, resulting in slippage. When starting from this condition the load is reduced, such a hysteresis as shown in FIG. 14 appears in the output signal. Once this hysteresis appears, the detecting resolution will be lowered.

Also, in the case where the strain gauge is pasted to the outer ring such as disclosed in the Patent Document 3 listed above, a problem has been found in assemblability.

Also, when a load Fz acting in the wheel support bearing assembly in a vertical direction is to be detected, the amount of strain is small because of the amount of deformation of the stationary ring relative to the load Fz is small, and, therefore, with the above described technique, the detecting sensitivity tends to be lowered and the load Fz can not be detected with high accuracy.

In view of the foregoing, the inventors of the present invention has developed a sensor-equipped wheel support bearing assembly of the following structure in an attempt to resolve the foregoing problems hereinabove discussed. Specifically, the wheel support bearing assembly employed in this sensor-equipped wheel support bearing assembly includes an outer member having an inner periphery formed with a plurality of rolling surfaces, an inner member having an outer periphery formed with rolling surfaces in face-to-face relation with the first mentioned rolling surfaces, and a plurality of rows of rolling elements interposed between the respective rolling surfaces in the outer and inner member and is designed to rotatably support a vehicle wheel relative to a vehicle body structure. A stationary member, which is one of the outer member and the inner member, has an outer diametric surface, on which one or more sensor units including one or more strain generating member, which includes two contact fixing segments, fixed to the outer diametric surface in contact therewith, and a cutout portion positioned intermediate between those two contact fixing segments, and a sensor fitted to the strain generating member for detecting a strain occurring in the strain generating member.

It has, however, been found that problems associated with mass productivity and cost arise if in the case of the above described construction, a plurality of cutout portions are provided in the strain generating member so that the strain may concentrate on a portion of the strain generating member, the strain generating member becomes complicated in shape.

An object of the present invention is to provide a sensor-equipped wheel support bearing assembly excellent in mass productivity and capable of detecting accurately the load acting on the vehicle wheel while concentration of the strain on a cutout portion corner area of the strain generating member employed in the sensor unit is avoided.

The sensor equipped bearing assembly according to one embodiment of the present invention is a bearing assembly, for rotatably supporting a vehicle wheel relative to a vehicle body structure, comprising an outer member having an inner periphery formed with a plurality of rolling surfaces; an inner member having an outer periphery formed with rolling surfaces in face-to-face relation with the rolling surfaces in the outer member; a plurality of rows of rolling elements interposed between the respective rolling surfaces in the outer and inner members; and at least one sensor unit including a strain generating member, having two or more contact fixing segments fixed to one of the outer member and the inner member that serves as a stationary member, in contact therewith, and a sensor fitted to the strain generating member for detecting a strain induced in the strain generating member, in which the strain generating member has a cutout portion positioned intermediate between the contact fixing segments and having a corner area of an arcuately sectioned shape.

When the load acts between a tire on the vehicle wheel and the road surface, the load is also applied to the stationary member (for example, the outer member) of the wheel support bearing assembly, accompanied by deformation. Since the two contact fixing segments of the strain generating member having the cutout portion in the sensor unit are fixed to the outer member in contact therewith, the strain induced in the outer member is transmitted to the strain generating member having been amplified, and such strain is subsequently detected by the sensor and, hence, the load can be calculated from an output signal from such sensor. In particular, since the corner area of the cutout portion is rendered to be of the arcuately sectioned shape, strain concentration on the corner area of the cutout portion is avoided and the possibility of plastic deformation is lowered. Also, in view of the fact that the strain no longer concentrate on the corner area of the cutout portion, variation in distribution at the detector unit in the strain generating member, that is, the sensor mounting area is minimized and, therefore, the influence, which the sensor mounting position affects on the output signal from the sensor, is minimized. Accordingly, the load can be calculated with high accuracy.

In one embodiment of the present invention, the strain generating member referred to above may be prepared of a plate material of a generally strip shape in a plain view and having the cutout portion defined at a side edge portion thereof.

When the strain generating member is prepared from the plate material, the strain induced in the stationary member can be easily amplified and transmitted to the strain generating member and such strain can be detected by the sensor with high sensitivity and, accordingly, the load can be calculated with high accuracy. Also, where the strain generating member is prepared from a thin plate material having a generally strip shape in a plane view and also having the cutout portion defined in a periphery of that side edge portion, the shape of the strain generating member can become simple, resulting in an excellent mass productivity.

In one embodiment of the present invention, the strain generating member the sensor unit may be so arranged on an outer diametric surface of the stationary member that the two contact fixing segments of the strain generating member assume the same axial positions of the stationary member and respective positions spaced from each other in a direction circumferentially thereof. In the case of this construction, the strain induced on the stationary member in the circumferential direction can be detected by the sensor unit. In other words, since the load acting between the vehicle tire and the road surface is transmitted from the rotating member to the stationary member through the rolling elements, the outer diametric surface of the stationary member deforms in the circumferential direction and the detecting sensitivity increased owing to the arrangement of the contact fixing segments as hereinabove described, resulting in further accurate calculation of the load.

In one embodiment of the present invention, the sensor unit may be so arranged on an outer diametric surface of the stationary member that the two contact fixing segments of the strain generating member may assume the same circumferential positions of the stationary member and respective positions spaced from each other in a direction axially thereof.

In one embodiment of the present invention, the stationary member may have an outer periphery formed with a vehicle body fitting flange adapted to be fitted to a knuckle and having a plurality of bolt holes defined at respective circumferential locations thereof and also having projecting pieces, provided in the circumferential locations at which the bolt holes are defined, protruding radially outwardly from the remaining portion of such flange, and two contact fixing segments of the strain generating member may be arranged intermediate between the neighboring projecting pieces. In the case of this construction, the strain generating member is arranged at a position spaced from the projecting piece, which tends to constitute a cause of the hysteresis, and the hysteresis occurring in the output signal of the sensor can be reduced, resulting in an accurate calculation of the load.

In one embodiment of the present invention, the sensor unit may be so arranged that the two contact fixing segments of the strain generating member may assume the same axial position of the stationary member and spaced a distance from each other in the circumferential direction, in which the distance between the two contact fixing segments is equal to or smaller than ½ of the distance between the neighboring projecting pieces. In the case of this construction, influences, which would be brought about by a slippage about the knuckle bolt tending to constitute a cause of the hysteresis, can be minimized and the hysteresis appearing in the output signal of the sensor is correspondingly reduced, allowing the load to be calculated with high accuracy.

In one embodiment of the present invention, the sensor unit may be arranged at an axial position, which is in a periphery of one of the plurality of the rolling surfaces that is located on an outboard side. In the case of this construction, the sensor unit is arranged at a location, where a relatively large grounding space is available and the amount of deformation as a result of the tire working force transmitted to the stationary member through the rolling elements is relatively large, the detecting sensitivity increases and the load can be calculated with high accuracy.

In one embodiment of the present invention, the strain generating member of the sensor unit may be of a kind which does not undergo any plastic deformation even in a condition, in which as a force acting on the stationary member or a working force acting between a vehicle wheel tire and the road surface, the maximum expected force is applied. If the plastic deformation occurs by the time the condition establishes, in which the maximum expected force is applied, deformation of the stationary member will not be transmitted to the sensor unit accurately, thus affecting the strain measurement, and, therefore, it is preferred that no plastic deformation occur even in a condition in which the maximum expected force is applied.

In one embodiment of the present invention, the contact fixing segments of the strain generating member may be fixed to the outer diametric surface of the stationary member through respective spacers. In the case of this construction, even when the strain generating member is in the form of a thin plate, the two contact fixing segments can be held in a non-contact condition relative to the stationary member and the strain occurring in the stationary member can be effectively transmitted to the strain generating member.

In one embodiment of the present invention, a groove may be formed intermediate between respective positions of the outer diametric surface of the strain generating member, at which the two contact fixing segments of the sensor unit are fixed. In the case of this construction, even when the strain generating member is in the form of a thin plate, the two contact fixing segments can be held in a non-contact condition relative to the stationary member and the strain occurring in the stationary member can be effectively transmitted to the strain generating member.

In one embodiment of the present invention, the stationary member may be provided with at least one or more pairs of the sensor unit made up of the two sensor units arranged at respective positions spaced 180° in a phase difference from each other in a direction circumferentially thereof. In the case of this construction, since when the load acting in a certain direction increases, an area, in which the rolling elements and the rolling surface contact with each other, and an area, in which no contact between the rolling elements and the rolling surface occur, appear spaced at a phase difference of 180° from each other, positioning of the sensor units at the phase difference of 180° from each other so as to meet such direction makes it possible for the load, which is to be applied to the stationary member through the rolling elements, to be necessarily transmitted to either one of the sensor units and, therefore, such load can be detected by the sensor.

In one embodiment of the present invention, the sensor unit pair referred to above may be provided in two pairs, in which case the two sensor unit of one pair of the sensor unit pair are arranged on top and bottom surface areas of the outer diametric surface of the stationary member, which assumes a top position relative to the tire tread whereas the two sensor unit of another pair of the sensor unit pair are arranged on right and left surface areas of the outer diametric surface of the stationary member, which assume a forward and rearward position relative to the tire tread. In the case of this construction, the load acting in the vertical direction and the load, which becomes a drive force, can be detected accurately under any loaded condition.

In one embodiment of the present invention, a calculating section may be provided for calculating a load from at least one of the absolute value of the output signal of the sensor, the average value of such output signal and the amplitude of such output signal.

It may occur that during the rotation of the wheel support bearing assembly, depending on the presence or absence of the rolling elements moving past portions of the rolling surfaces proximate to the sensor unit, the amplitude of the output signal from the sensor in the sensor unit may cyclically change. Accordingly, by measuring the cycle of the amplitude of the output signal with the calculating section, the speed at which the rolling elements move past those portion of the rolling surfaces, that is, the number of revolutions of the vehicle wheel can also be detected. Where no change appear, the load can be calculated from the absolute value.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will be hereinafter described in detail with particular reference to FIGS. 1 to 6. This first embodiment is directed to an inner ring rotating model of a third generation type and is applied to a wheel support bearing assembly for the support of a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
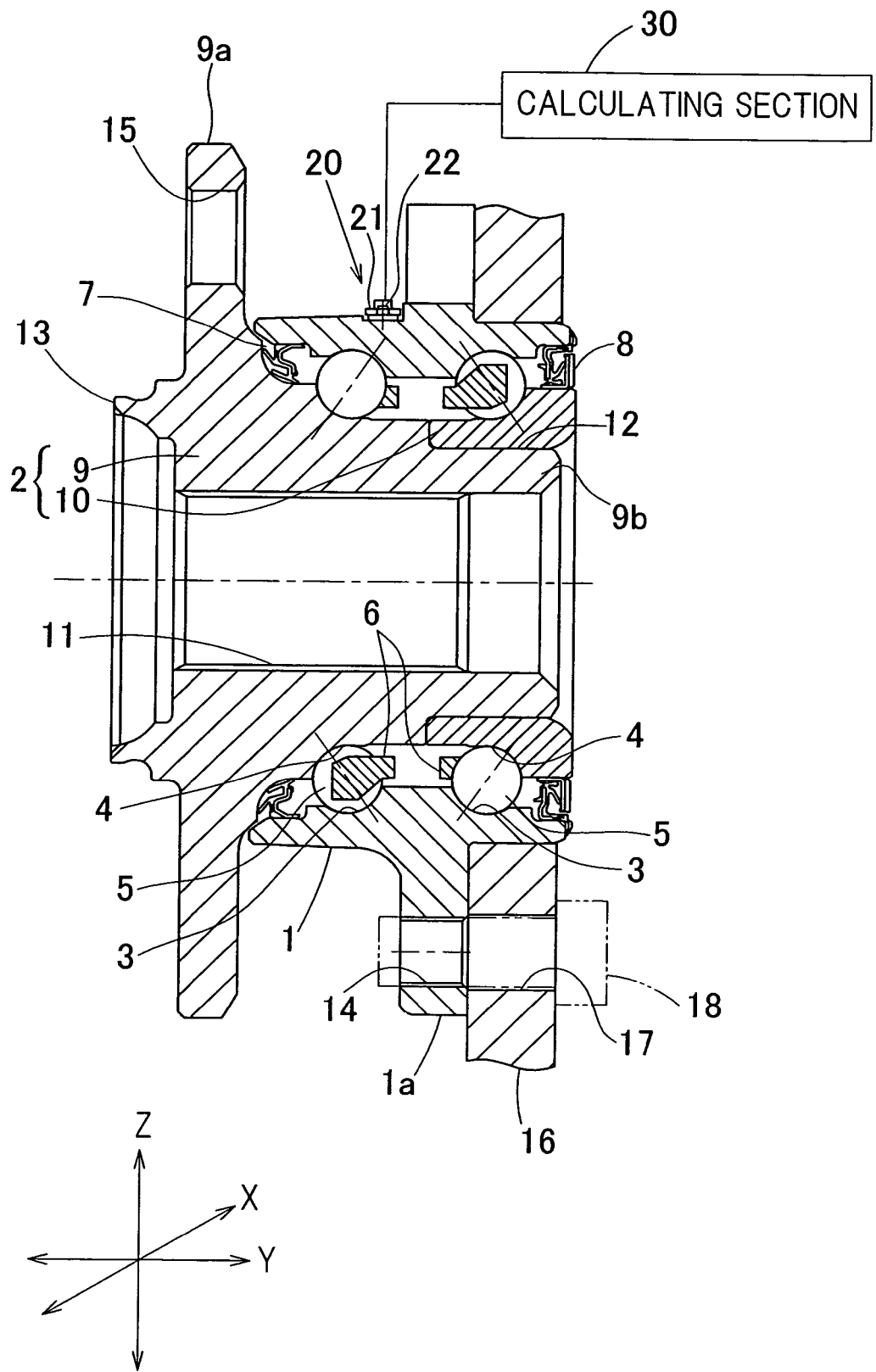
FIG. 1 is a diagram showing a sectional view of a sensor-equipped wheel support bearing assembly according to a first embodiment of the present invention and a block diagram of a conceptual construction of a detecting system employed therein.

A bearing unit in this wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 in face-to-face relation with the respective rolling surfaces 3, and a plurality of rows of rolling elements 5 interposed between the plurality of those rolling surfaces 3 and 4. This wheel support bearing assembly is rendered to be a double row angular contact ball bearing design, in which the rolling elements 5 are employed in the form of balls and retained by a retainer 6 employed for each of the rows. The rolling surfaces 3 and 4 referred to above have a sectional shape representing an arcuate shape and are so formed as to permit the ball contact angles to assume a back-to-back relation to each other. Opposite ends of a bearing space delimited between the outer member 1 and the inner member 2 are sealed respectively by sealing devices 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The vehicle body fitting flange 1a has knuckle fitting bolt holes 14 defined therein at a plurality of locations spaced in a direction circumferentially thereof and, therefore, the vehicle body fitting flange 1a can be secured to the knuckle 16 when knuckle bolts 18 inserted from an inboard side into respective bolt insertion holes 17 defined in the knuckle 16 are threaded into the corresponding bolt holes 14.

The inner member 2 is of a type that serves as a rotating member and includes a hub unit 9 having a wheel mounting hub flange 9a formed therein, and an inner ring 10 mounted on an outer periphery of an inboard end of a hub unit 9b of the hub unit 9. The rolling surfaces 4 referred to above are formed respectively in the hub unit 9 and the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a throughhole 11 extending completely therethrough. The hub flange 9a is provided with a plurality of press fitting holes 15 defined at respective circumferential locations, spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component protrudes (not shown) towards the outboard side.

Figure 2:
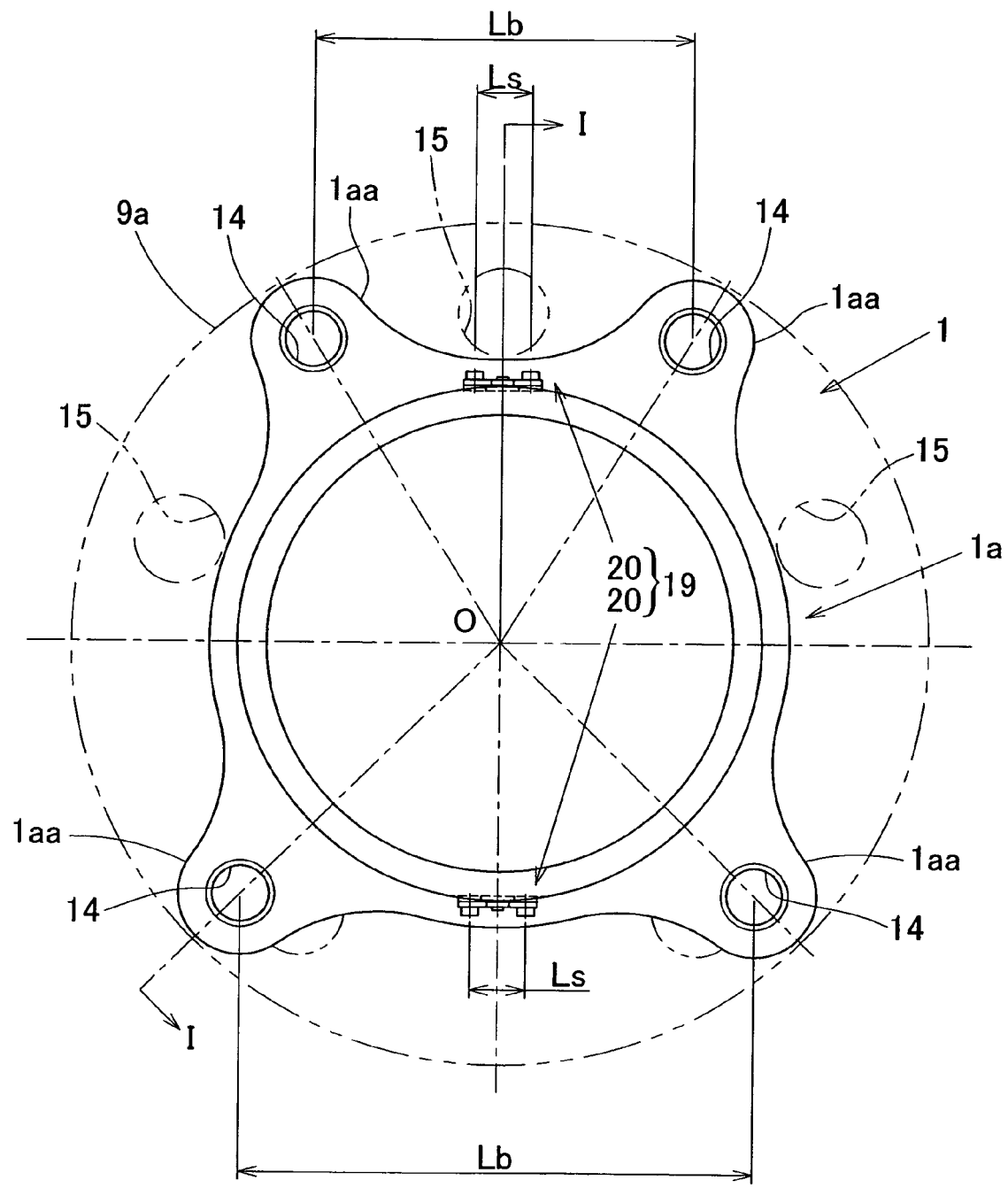
FIG. 2 is a front elevational view of an outer member of the sensor-equipped wheel support bearing assembly as viewed from an outboard side.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. As best shown in FIG. 2, the vehicle body fitting flange 1a referred to previously has projecting pieces 1aa at respective circumferential locations where the corresponding bolt holes 14 are defined, which protrude in a direction radially outwardly beyond the remaining area.

The outer member 1, which is the stationary member, has an outer diametric surface, on which a sensor unit pair 19 made up of two sensor units 20 are provided. Those two sensor units 20 are disposed at respective positions on the outer diametric surface of the outer member 1, having a phase difference of 180° from each other in a direction circumferentially of the outer member 1. Two or more sensor unit pairs 19 may be provided. In the illustrated embodiment now under discussion, the two sensor units 20 forming the sensor unit pair 19 are provided at two locations, that is, top and bottom surface areas of the outer diametric surface of the outer member 1, which assume a top position relative to a tire tread, so that a load Fz acting on the wheel support bearing assembly or the vehicle tire in a vertical direction or a load Fy acting on the wheel support bearing assembly or the vehicle tire in an axial direction may be detected. More specifically, as shown in FIG. 2, one of the sensor units 20 is disposed on the top surface area of the outer diametric surface of the outer member 1 and positioned at a portion of such top surface area intermediate between the neighboring projecting pieces 1aa, whereas the other of the sensor units 20 is disposed on the bottom surface area of the outer diametric surface of the outer member 1 and positioned at a portion of such bottom surface area intermediate between the neighboring projecting pieces 1aa.

Figure 3:
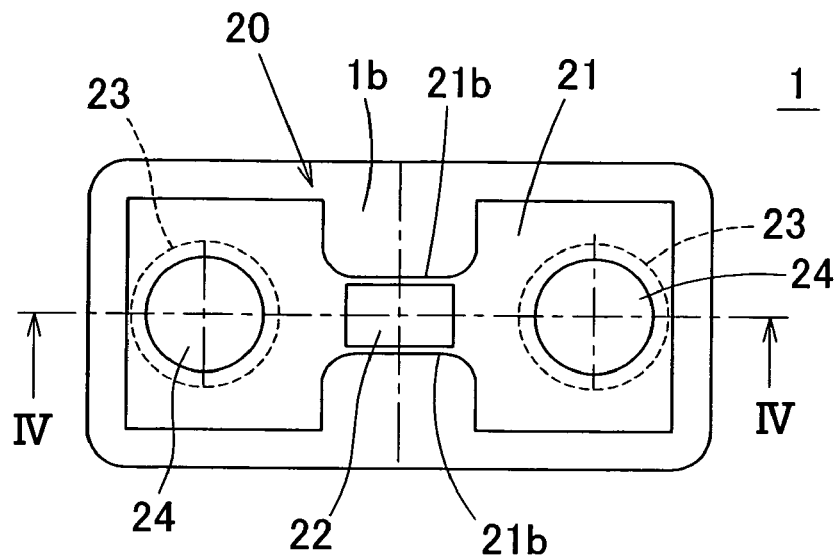
FIG. 3 is an enlarged top plan view of a sensor unit employed in the sensor-equipped wheel support bearing assembly.
Figure 4:
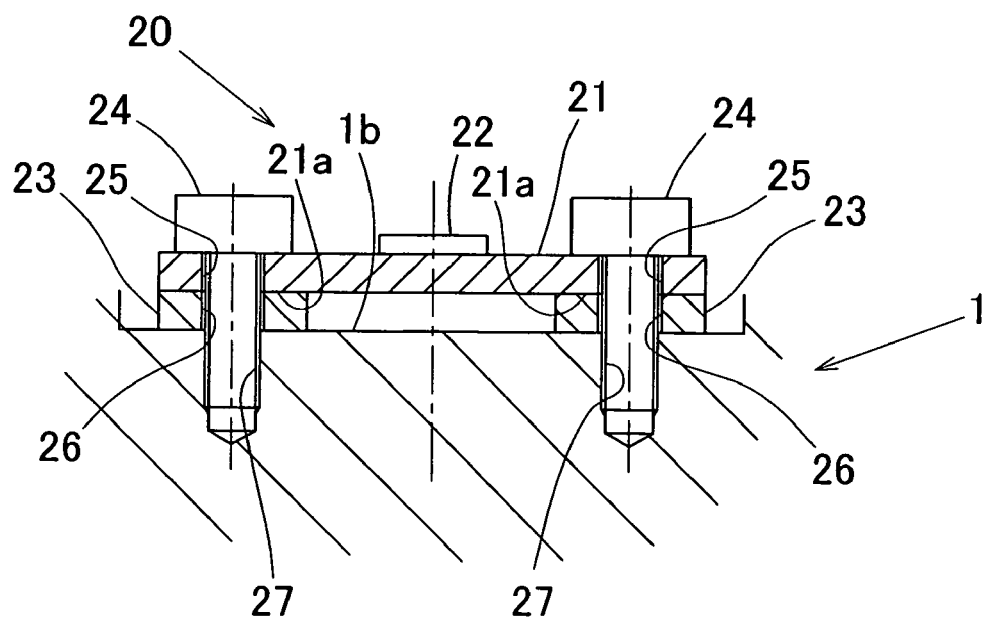
FIG. 4 is a cross sectional view taken along the line IV-IV in FIGS. 3 and 11.

Each of those sensor units 20 is, as best shown in FIGS. 3 and 4 in an enlarged top plan view and an enlarged sectional view, respectively, made up of a strain generating member 21 and a sensor 22 mounted on the strain generating member 21 for detecting a strain occurring in the strain generating member 21. The strain generating member 21 is prepared from a thin metal sheet capable of undergoing an elastic deformation, such as, for example, a steel sheet having a thickness equal to or smaller than 3 mm. The strain generating member 21 represents a generally strip shape, in a plane view, of a constant width, and has cutout portions 21b defined in opposite side edges thereof at a location intermediate of the length of the strain generating member 21. Each of the cutout portions 21b has corner areas of an arcuately sectioned shape. The strain generating member 21 also has two contact fixing segments 21a defined respectively in opposite ends thereof, which segments 21a are adapted to be fixed to the outer diametric surface of the outer member 1 in contact therewith through a corresponding spacer 23. It is to be noted that depending on the shape of the strain generating member 21, more than two contact fixing segments 21 may be employed in the strain generating member 21. The sensor 22 is pasted to a portion of the strain generating member 21, at which the strain occurs largely for a load acting in various directions. In the instance as shown, for that portion of the strain generating member 21, an intermediate portion on an outer surface side of the strain generating member 21, which is formed between the cutout portions 21b in the opposite side edges thereof, is chosen and, hence, the sensor 22 detects a circumferentially oriented strain induced in a periphery of the cutout portions 21b. It is to be noted that the strain generating member 21 is preferably of a kind unable to undergo a plastic deformation even in a condition, in which as an external force acting on the outer member 1, which is the stationary member, or a working force acting between the vehicle tire and the road surface, the maximum expected force is applied. Once such a plastic deformation occurs, the deformation of the outer member 1 will not be transmitted accurately to the sensor unit 20 and, therefore, measurement of the strain will be adversely affected. The maximum expected force referred to above is the maximum force, which will not result in a damage to the wheel support bearing assembly.

The sensor unit 20 referred to previously is of such a design, in which the two contact fixing segments 21a of the strain generating member 21 employed therein are arranged on the outer diametric surface of the outer member 1 so as to occupy respective positions of the same size in the axial direction, which are spaced from each other in a circumferential direction of the outer member 1, and those contact fixing segments 21a so positioned are fixed to the outer diametric surface of the outer member 1 through respective spacers 23 by means of associated bolts 24. In such case, the distance Ls between the two contact fixing segments 21a is chosen to be of a distance equal to or smaller than ½ of the distance Lb between the neighboring projecting pieces 1aa in the vehicle body fitting flange 1a of the outer member 1. Each of the bolts 24 referred to above is threaded into a corresponding bolt hole 27, defined in an outer peripheral portion of the outer member 1, after having been passed through a respective bolt insertion hole 25, defined in each of the contact fixing segments 21a so as to extend radially, and then through a bolt insertion hole 26 defined in the associated spacer 23. Thus, when the contact fixing segments 21a are fixed to the outer diametric surface of the outer member 1 through the respective spacers 3, the intermediate portion of the strain generating member 21 in the form of a thin plate member, in which the cutout portions 21b are formed, can be kept spaced from the outer diametric surface of the outer member 1 and, accordingly, a strain deformation occurs easily in a periphery of the cutout portions 21b. For axial position of the contact fixing segments 21a, axial position in a periphery of the rolling surface 3 on the outboard side in the outer member 1 is chosen in the instance as shown. The periphery of the rolling surface 3 on the outboard side referred to above means a region ranging from an middle position between the rolling surfaces 3 on the inboard side and outboard side to an area in which the rolling surface 3 on the outboard is formed. In order for the sensor unit 20 to be stably fixed to the outer diametric surface of the outer member 1, an area of the outer diametric surface of the outer member 1, on which the respective spacer 23 is fixed in contact therewith, is formed as a flat area 1b.

Figure 5:
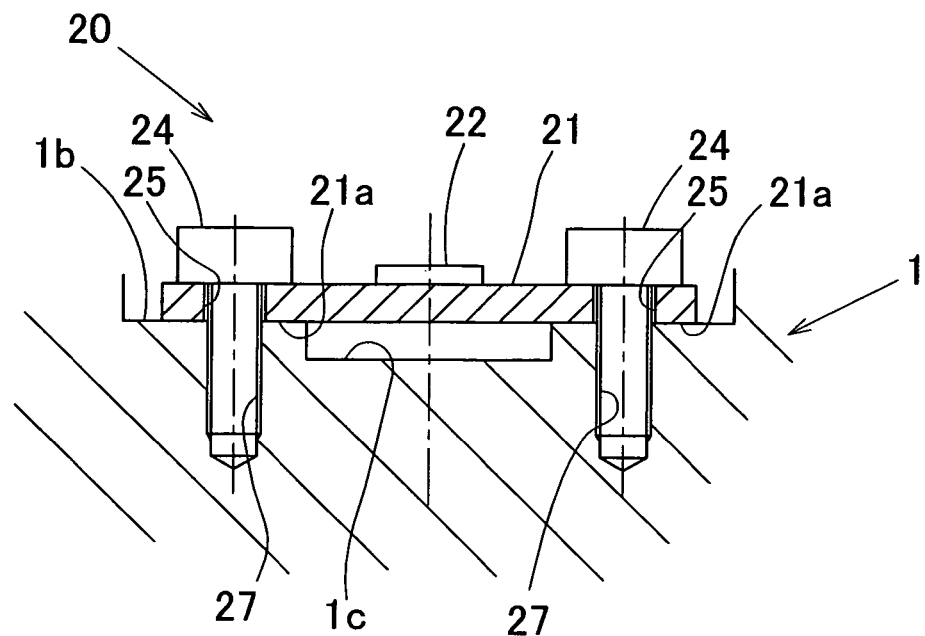
FIG. 5 is a sectional view showing another example of installation of the sensor unit.

Other than that, as shown in FIG. 5 in a sectional view, the outer diametric surface of the outer member 1 may have a groove 1c defined therein at a location intermediate between the two locations, at which the two contact fixing segments 21 of the strain generating member 21 are fixed, so that the use of the respective spacer 23 can be dispensed with and the intermediate portion of the strain generating member 21 between the two contact fixing segments 21a, in which the cutout portions 21b are formed, can be spaced from the outer diametric surface of the outer member 1.

For the sensor 22, any of various sensors may be employed. For example, the sensor 22 can be constructed in the form of a metal foil strain gauge. In such case, it is fixed to the strain generating member 21 by means of bonding.

The sensor 22 of the sensor unit 20 is connected with a calculating section 30. The calculating section 30 calculates the working force acting between the vehicle wheel tire and the road surface in reference to an output signal of such sensor 22 and includes, inter alia, a signal processing circuit and a correcting circuit. This calculating section 30 includes a relation setting circuit (not shown), in which the relation between the working force between the vehicle wheel tire and the road surface and the output signal of the sensor 22 is set in terms of arithmetic equations or tables, and is operable in response to the inputted signal outputted from the sensor 22 to output the working force using the relation setting circuit. Contents preset in the relation setting circuit are set by means of a series of experiments and/or simulations conducted beforehand.

When a load acts between the vehicle wheel tire and the road surface, such load is applied also to the outer member 1, which is the stationary member of the wheel support bearing assembly, resulting in occurrence of deformation thereof. Since the two contact fixing segments 21a of the strain generating member 21 in the sensor unit 20, which has the cutout portions 21b defined therein, are fixed to the outer member 1 in contact therewith, the strain occurring in the outer member 1 is transmitted to the strain generating member 21 having been amplified, and such strain is then detected by the sensor 22 and, hence, the load can be calculated from the output of such sensor 22. In such case, since the corner areas of the cutout portions 21b have the arcuately sectioned shape, strain concentrate on those corner areas of the cutout portions 21b is avoided and the possibility of the plastic deformation occurring is reduced. Also, in view of the fact that strain concentrate on the corner areas of the cutout portions 21b is avoided, variation in distribution at a detector unit in the strain generating member, that is, the area at which the sensor 22 is fitted, is minimized and, therefore, the influence of the fitting position of the sensor 22 on the output signal from the sensor is minimized. Accordingly, the load can be calculated with high accuracy.

Although in the foregoing description, reference is made to the detection of the working force between the vehicle wheel tire and the road surface, the detection may be made not only for the working force acting between the vehicle wheel tire and the road surface, but also for the force acting on the wheel support bearing assembly (for example, a preload amount).

When the detected load obtained from the sensor-equipped wheel support bearing assembly is used in a vehicle control of the automotive vehicle, it can contribute to a stabilized travel of the automotive vehicle. Also, by utilizing this sensor-equipped wheel support bearing assembly, the load sensor can be installed compactly in the automotive vehicle and the mass productivity can be excellent and the cost can also be reduced.

In the case of the foregoing embodiment, since the strain generating member 21 of the sensor unit 20 is in the form of a thin plate member having a generally strip shape in a plane view with the cutout portions defined in the opposite side edges thereof, the strain can be easily transmitted, having been amplified, to the strain generating member 21 and such strain can be detected by the sensor 22 with high sensitivity, the hysteresis appearing in the output signal of such sensor 22 is minimized and, therefore, the load can be calculated with high accuracy. Also, the shape of the strain generating member 21 suffices to be simple and the mass productivity thereof comes to be excellent.

Also in the foregoing embodiment, since in installing the sensor unit 20 onto the outer diametric surface of the outer member 1 in the form of the stationary member, the two contact fixing segments 21a of the strain generating member 21 are so arranged as to assume the same axial positions of the outer member 1 and the positions spaced from each other in the circumferential direction, the strain in the direction circumferentially of the outer member 1 can be detected by the sensor unit 20. In the case of this embodiment, the load acting between the vehicle wheel tire and the road surface can be transmitted from the inner member 2 in the form of the rotating member, to the outer member 1 through the rolling elements 5. As a result thereof, the outer diametric surface of the outer member 1 strains in a circumferential direction, and, therefore, positioning of the contact fixing segments 21a in the manner described above enables the detecting sensitivity to increase and the load can therefore be calculated with further high accuracy.

In addition, although in the foregoing embodiment, respective circumferential portions of the vehicle body fitting flange 1a of the outer member 1, which is the stationary member, at which a plurality of bolt holes 14 are formed for connection with the knuckle, have been shown and described as formed as the projecting pieces 1aa that protrude beyond any other portion of the vehicle body fitting flange 1a, since the two contact fixing segments 21a of the strain generating member 21 in the sensor unit 20 are arranged intermediate between the neighboring projecting pieces 1aa, the strain generating member 21 is therefore arranged at a location spaced from the projecting pieces 1aa, which tends to constitute a major cause of the hysteresis. Therefore, the hysteresis appearing in the output signal from the sensor 22 can be reduced and the load can be consequently detected accurately.

Also, considering that the distance Ls between the two contact fixing segments 21a is chosen to be equal to or smaller than ½ of the distance Lb between the neighboring projecting pieces 1aa, influences, which would be brought about by a slippage about the knuckle bolt 18 (FIG. 1) tending to constitute a cause of the hysteresis, can be minimized and the hysteresis appearing in the output signal of the sensor 22 is correspondingly reduced, allowing the load to be calculated with high accuracy.

Also, since in the foregoing embodiment, the sensor unit 20 is arranged at the axial position proximate to one of the plurality of the rolling surfaces 3 in the outer member 1, which is on the outboard side, that is, at the axial position where a relatively large space for installation is available and the amount of deformation, which takes place when the tire working force is transmitted to the outer member 1 through the rolling elements 5, is relatively large, the detecting sensitivity can be increased to allow the load to be calculated with high accuracy.

Also, since in the foregoing embodiment, the at least one sensor unit pair 19, comprised of the two sensor units 20 positioned on the outer diametric surface of the outer member 1 in the form of the stationary member, and spaced at a phase difference of 180° from each other in a direction circumferentially of the outer member 1, is employed, the load can be calculated with high accuracy under various loaded conditions. In other words, since when the load acting in a certain direction increases, an area, in which the rolling elements 5 and the rolling surface 3 contact with each other, and an area in which no contact between the rolling elements 5 and the rolling surface 3 occur, appear spaced at a phase difference of 180° from each other, positioning of the sensor units 20 at the phase difference of 180° from each other so as to meet such direction makes it possible for the load, which is to be applied to the outer member 1 through the rolling elements 5, to be necessarily transmitted to either one of the sensor units 20 and, therefore, such load can be detected by the sensor 22.

Figure 6:
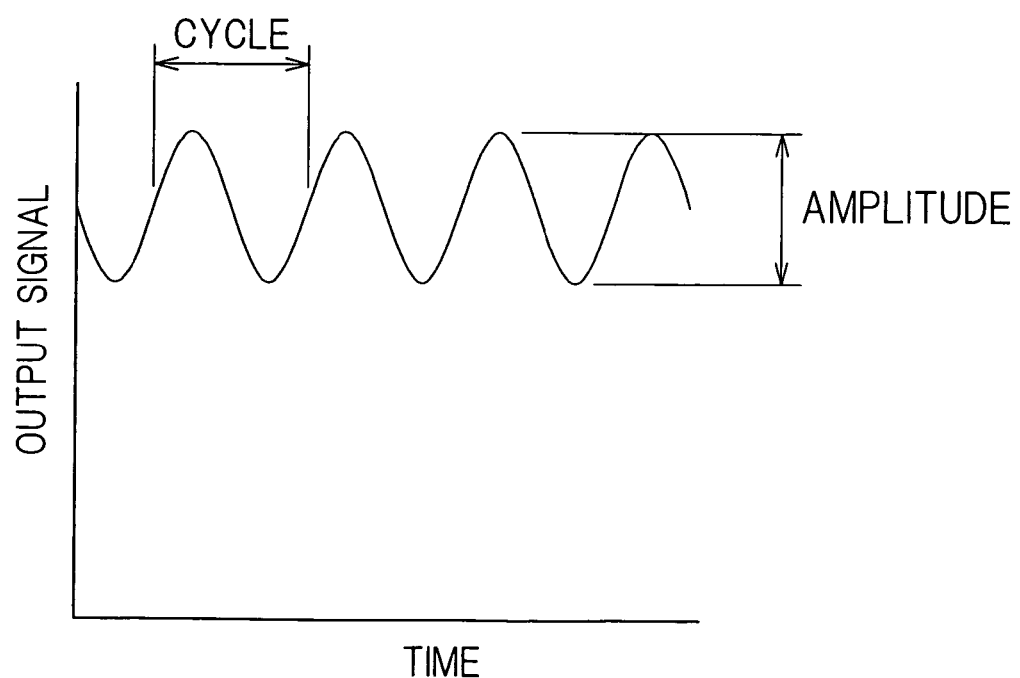
FIG. 6 is a diagram showing a waveform of an output signal from the sensor unit employed in the sensor-equipped wheel support bearing assembly.

Also, it may occur that during the rotation of the wheel support bearing assembly, depending on the presence or absence of the rolling elements 5 moving past portions of the rolling surfaces 3 in a periphery of the sensor unit 20, the amplitude of the output signal from the sensor 22 in the sensor unit 20 may cyclically change as shown by the waveform in FIG. 6. The reason therefor is that the amount of deformation during the presence of the rolling elements 5 moving past those portions of the rolling surfaces 3 and the amount of deformation during the absence of the rolling elements 5 moving past those portions of the rolling surfaces 3 are different from each other and the amplitude of the output signal from the sensor 22 has a peak value for each cycle of passage of the rolling elements 5 past those portions of the rolling surfaces 3. In view of the above, when the cycle of the peak value in the detection signal is, for example, measured by the calculating section 30, the speed at which the rolling elements 5 move past those portions of the rolling surfaces 3, that is, the number of revolutions of the vehicle wheel can also be detected. As hereinabove described, where a change appears in the output signal, the calculating section 30 can calculate the load from the average value or the amplitude of the output signal of the sensor 22 in the sensor unit 20. Where no change appears, the load can be calculated from the absolute value.

It is to be noted that in the foregoing embodiment, the following constructions are not specifically limited.

The number of the sensor units 20 employed, the place of installation thereof, and the number of each of the contact fixing segments 21a, the sensors 22 and the cutout portions 21b employed.

The shape of the sensor unit 20, the method of fixing (bonding or welding, for example), and the orientation of the sensor unit 20 fixed. (Axially acting strain may be detected.)

Figure 7:
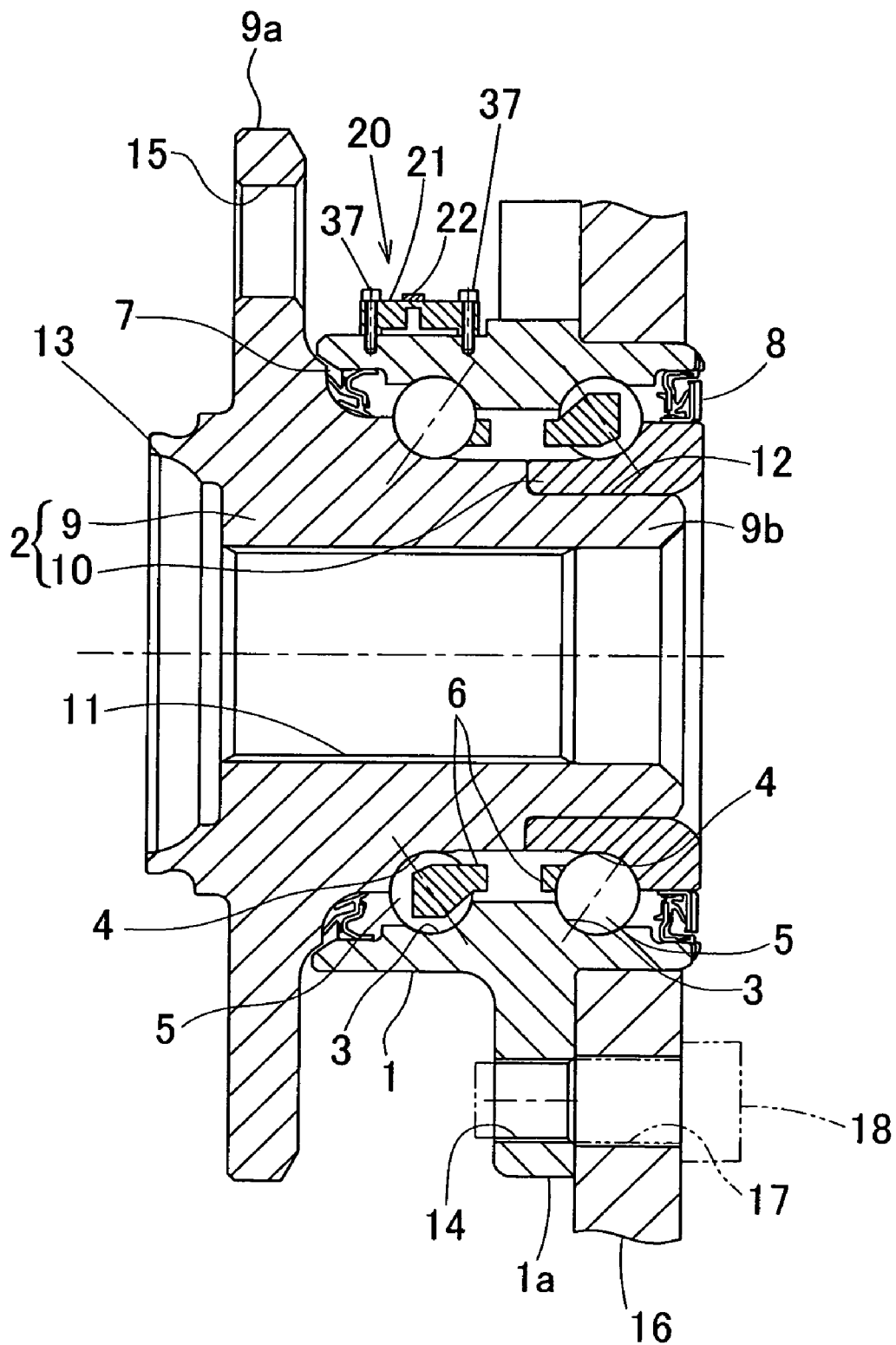
FIG. 7 is a sectional view of the sensor-equipped wheel support bearing assembly according to a second embodiment of the present invention.
Figure 8:
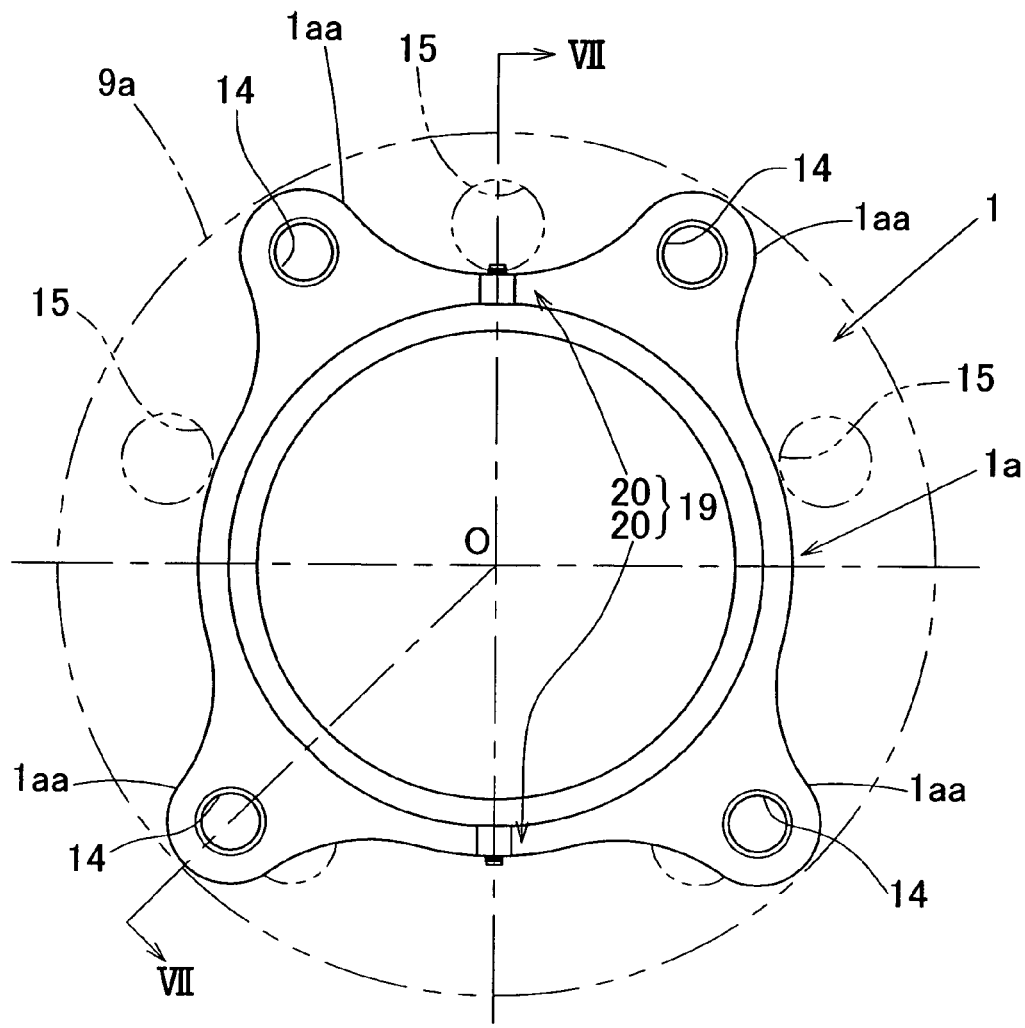
FIG. 8 is a front elevational view of the outer member of the sensor-equipped wheel support bearing assembly as viewed from the outboard side.
Figure 9:
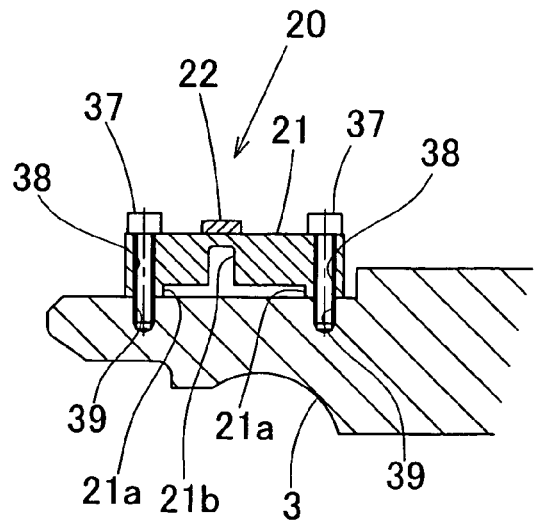
FIG. 9 is an enlarged sectional view of the sensor unit employed in the sensor-equipped wheel support bearing assembly.

FIGS. 7 to 9 illustrate a second embodiment of the present invention. In this sensor-equipped wheel support bearing assembly, the two sensor units 20 of the sensor unit pair 19, employed in the practice of the first embodiment shown in and described with particular reference to FIGS. 1 to 6, are so constructed as hereinbelow described. Even in this case, as best shown in FIG. 9 showing an enlarged sectional view each of the sensor units 20 is made up of a strain generating member 21 and a sensor 22 fitted to this strain generating member 21 and operable to detect the strain occurring in the strain generating member 21. The strain generating member 21 has two contact fixing segments 21a defined at opposite ends thereof so as to extend inwardly thereof in a direction confronting the outer diametric surface of the outer member 1 and is mounted on the outer member 1 with the two contact fixing segments 21a fixed to the outer diametric surface of the outer member 1 in contact therewith. One of the two contact fixing segments 21a is arranged at an axial position in a periphery of the rolling surface 3 on the outboard side in the outer member 1 whereas the other of the contact fixing segments 21a is held at a position on the outboard side of that position. Further, those contact fixing segments 21a are arranged at respective positions, where they assume the same phase relation with each other in a direction circumferentially of the outer member 1. In other words, the sensor units 20 are so arranged on the outer diametric surface of the outer member 1 that the two contact fixing segments 21a of the strain generating member 21 can assume the same circumferential positions of the outer member 1 and respective positions spaced in the axial direction. The periphery of the rolling surface 3 on the outboard side referred to above means a region ranging from an intermediate position between the rolling surface 3 on the inboard side and the rolling surface 3 on the outboard side to an area in which the rolling surface 3 on the outboard side is formed. Even in this case, in order for the sensor unit 20 to be stably fixed to the outer diametric surface of the outer member 1, an area of the outer diametric surface of the outer member 1 on which the contact fixing segments 21a of the strain generating member 21 are fixed in contact therewith, is preferably formed as a flat area.

Also, a cutout portion 21b is formed in an intermediate portion of the strain generating member 21 so as to open inwardly. Even in this case, the cutout portion 21b has corner areas of an arcuately sectioned shape so that strain will not concentrate on those corner areas of the cutout portion 21b. The sensor 22 is pasted to a portion of the strain generating member 21, where the strain becomes large relative to the load acting in various directions. In the instance as shown, for that portion of the strain generating member 21, a portion of the strain generating member 21 in a periphery of the cutout portion 21b, specifically, a portion of the strain generating member 21 on an outer surface side thereof, which assumes a rear side of the cutout portion 21b is chosen and, hence, the sensor 22 detects a strain induced in a periphery of the cutout portions 21b.

The strain generating member 21 has two contact fixing segments 21a, which are fixed to the outer diametric surface of the outer member 1 by means of respective bolts 37 fastened thereto. More specifically, those bolts 37 are threaded into respective bolt holes 39, defined in an outer peripheral portion of the outer member 1, after having been passed through associated bolt insertion holes 38, which are defined in the contact fixing segments 21a so as to extend radially completely across those contact fixing segments 21a. It is to be noted that for a method of fixing the contact fixing segments 21a, other than the use of the bolts 37 described above, a bonding agent may be employed. At any other location than the contact fixing segments 21a of the strain generating member 21, a gap is formed between the outer diametric surface of the outer member 1 and the contact fixing segments 21a. Other structural features are similar to those employed in the first embodiment shown in and described with particular reference to FIGS. 1 to 6. It is to be noted that FIG. 7 is a front elevational view of the outer member 1 of the wheel support bearing assembly as viewed from the outboard side and is a cross sectional view taken along the line VII-VII in FIG. 8.

Figure 10:
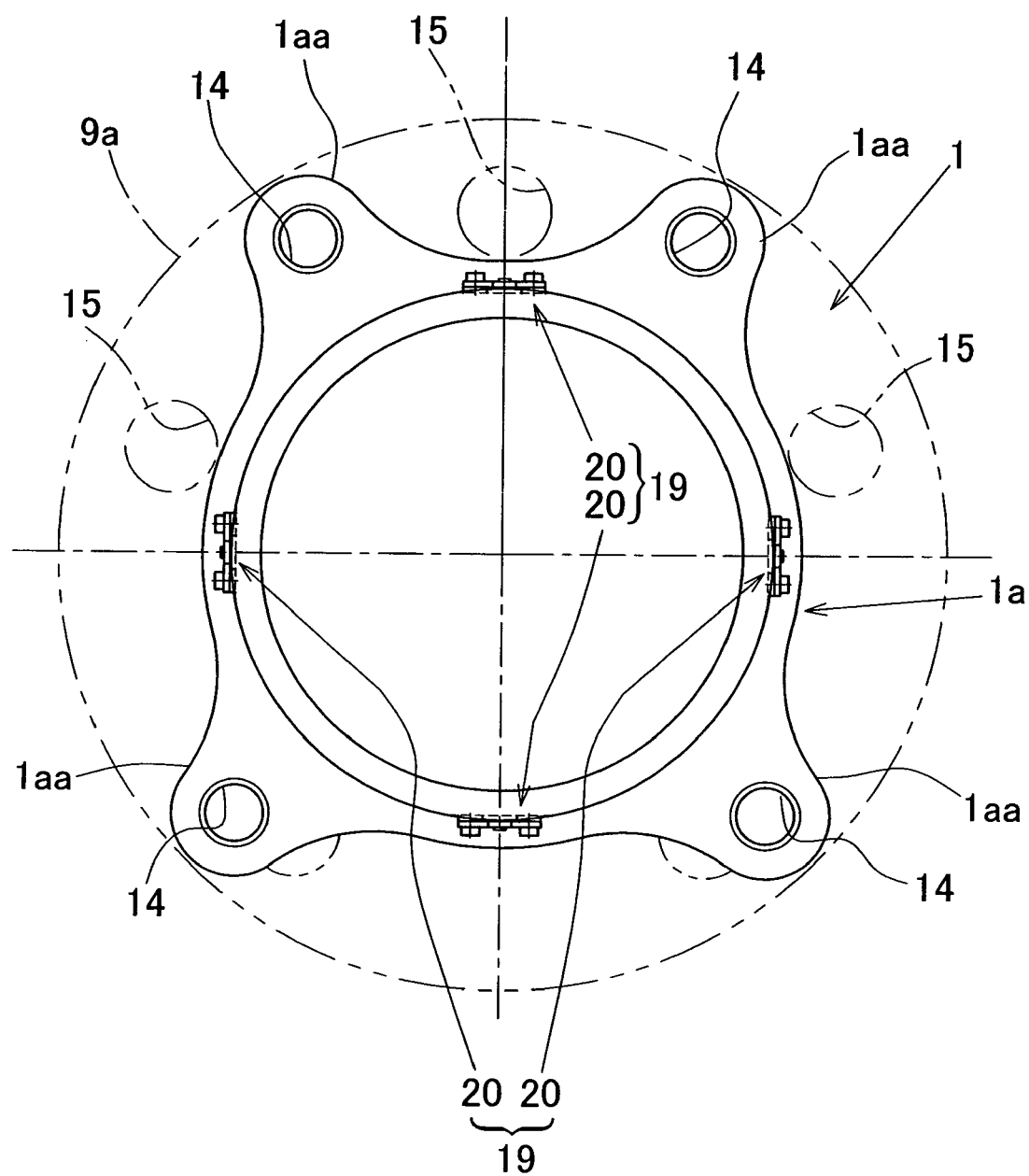
FIG. 10 is a front elevational view of the outer member, employed in the sensor-equipped wheel support bearing assembly according to a third embodiment of the present invention, as viewed from the outboard side.

FIG. 10 illustrates a third embodiment of the present invention. In this sensor-equipped wheel support bearing assembly, in addition to one pair of the sensor unit pair 19 made up of the two sensor units 20, which are arranged on the top and down surface areas of the outer diametric surface of the outer member, which assume the top position relative to the tire tread, in the practice of the first embodiment shown in and described with particular reference to FIGS. 1 to 6, another pair of the sensor unit pair 19 made up of two sensor units 20 arranged on right and left surface areas of the outer diametric surface of the outer member 1, which assume a vertical position relative to the tire tread, are employed. Other structural features are similar to those employed in the first embodiment shown in and described with particular reference to FIGS. 1 to 6.

In the case of this construction, from a detection signal of one pair of the sensor unit pair 19 made up of the two sensor units 20 arranged on the top and bottom surface areas of the outer diametric surface of the outer member 1, the load Fz acting on the wheel support bearing assembly or the vehicle tire in the vertical direction or the load Fy acting in the axial direction can be calculated accurately. Also, from a detection signal from the other pair of the sensor unit pair 19 made up of the two sensor units 20 arranged on the right and left surface areas of the outer diametric surface of the outer member 1, a load Fx, which serves as a drive force, can be calculated accurately. In other words, under any loaded condition, the vertically acting load Fz, the axially acting load Fy and the load Fx serving as the drive force can be detected accurately.

Figure 11:
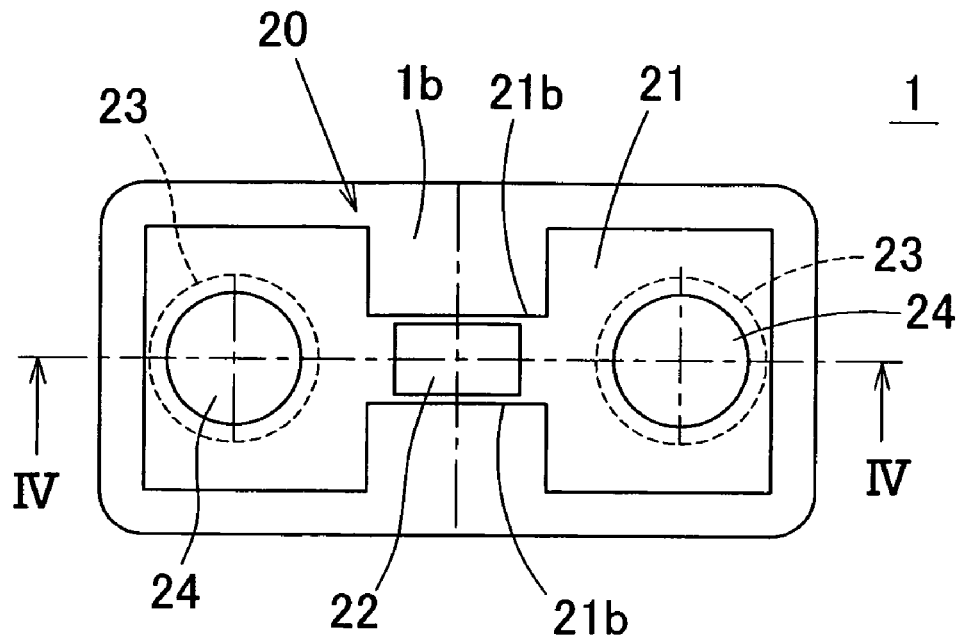
FIG. 11 is an enlarged top plan view of the sensor unit employed in the sensor-equipped wheel support bearing assembly according to a first applied example related to the present invention.
Figure 12:
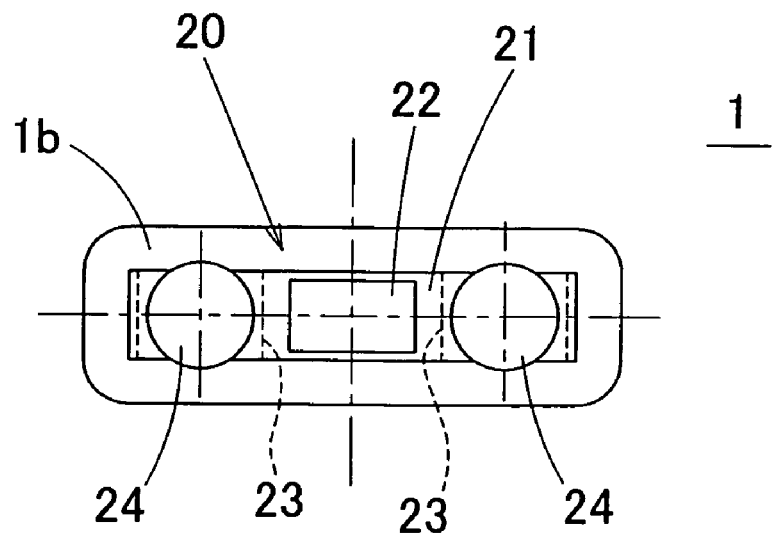
FIG. 12 is an enlarged top plan view of the sensor unit used in a second applied example.

In the description that follows, the sensor-equipped wheel support bearing assembly according to applied examples related to the present invention will be described with particular reference to FIGS. 11 to 13. FIG. 11 illustrates an enlarged top plan view of the sensor unit employed in the sensor-equipped wheel support bearing assembly according to the first applied example, which does not have such a structure of the present invention that the corner areas of the cutout portion 21b in the strain generating member 21 may be of an arcuately sectioned shape. As shown therein, in this first applied example, the corner areas of the cutout portion 21b do not represent an arcuately sectioned shape. The strain generating member 21 is prepared from a thin plate material and, as is the case with that shown in FIG. 4, a sensor unit pair 19 made up of two sensor units 20 is provided in a flat area 1b of the outer diametric surface of the outer member 1. Also, as is the case with that shown in FIG. 2, the two contact fixing segments 21a of the strain generating member 21 in the sensor unit 20 are arranged intermediate between the neighboring projecting pieces 1aa and, hence, the strain generating member 21 is arranged at a position spaced from the projecting pieces 1aa, which constitute a cause of the hysteresis and the hysteresis appearing in the output signal of the sensor 22 can be reduced correspondingly to allow the load to be calculated with high accuracy. Also, since the distance Ls between the two contact fixing segments 21a is chosen to be equal to or smaller than ½ of the distance Lb between the neighboring projecting pieces 1aa, influences, which would be brought about by a slippage about the knuckle bolt 18 (FIG. 1), which may constitutes a cause of the hysteresis, can be minimized and the hysteresis appearing in the output signal of the sensor 22 is correspondingly reduced, allowing the load to be calculated with high accuracy. The sensors 22 of the sensor unit 20 are connected with the calculating section 30 as is the case with those shown in FIG. 1. It is to be noted that in FIG. 11, component parts similar to those shown and described in connection with the first embodiment are designated by like reference numerals and, therefore, the details thereof are not reiterated for the sake of brevity.

In the sensor unit 20 according to the foregoing first applied example, if as best shown in FIG. 5, a groove 1c is provided at a portion of the strain generating member 21 intermediate between the respective locations of the outer diametric surface of the outer member 1, where the contact fixing segments 21a of the strain generating member 21 are fixed, the use of the spacer 23 can be dispensed with and that portion of the strain generating member 21 between the contact fixing segments 21a, where the cutout portion 21b is positioned, may be separated from the outer diametric surface of the outer member 1. Also, the strain generating member of the sensor unit 20 may have a strip shape in its approximate top plane shape as shown in a second applied example shown in FIG. 12 and, in which case, no cutout portion 21b such as employed in the first example shown in FIG. 11 is formed.

Figure 13:
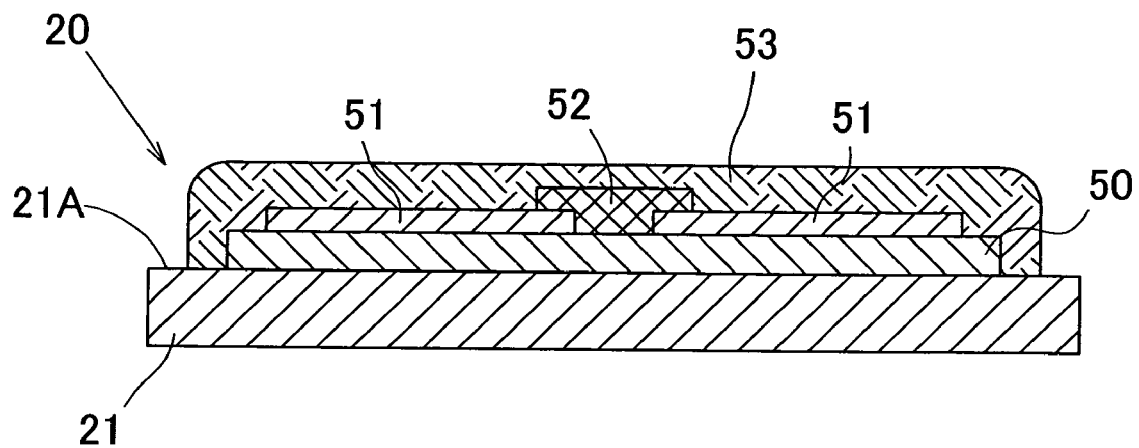
FIG. 13 is an enlarged top plan view of the sensor unit used in a third applied example.
Figure 14:
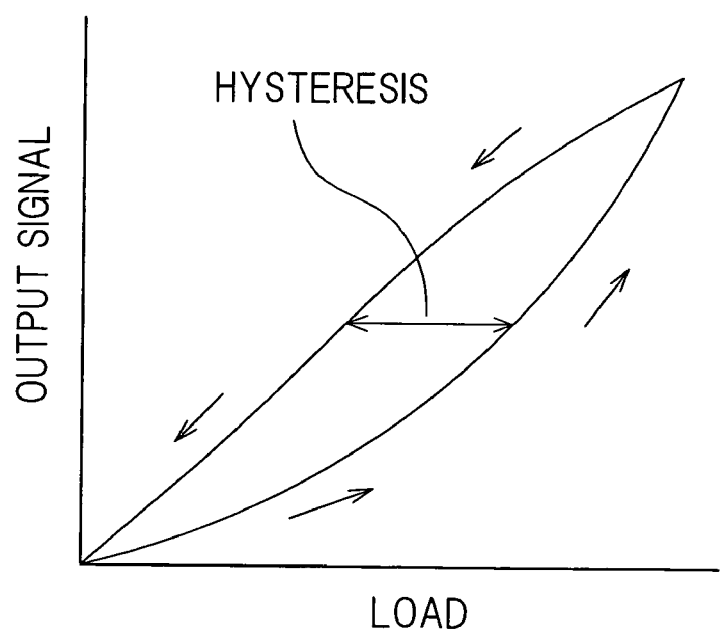
FIG. 14 is a characteristic diagram showing the hysteresis appearing in the output signal in the related art.

As shown in FIG. 13 as a third applied example, the sensors of the sensor unit 20 can be formed on the strain generating member 21 with a thick film resistance element. The sensor unit 20 shown therein is of such a structure, in which it has an insulating layer 50 formed on a sensor mounting surface 21A of the strain generating member 21, a pair of electrodes 51 and 51 are formed on respective sides of a front surface of the insulating layer 50, a strain measuring resistance element 52, which serves as a sensor, is formed on the insulating layer 50 at a location between those electrodes 51 and 51, and a protective film 53 is formed over the electrodes 51 and 51 and the strain measuring resistance element 52.

A method of making this sensor unit 20 will now be described. At first, an insulating material such as, for example, glass is printed and baked on a surface of the strain generating member 21, which has been formed of a metallic material such as a stainless steel, to thereby form the insulating layer 50. Subsequently, on a surface of the insulating layer 50, an electroconductive material is printed and baked to form the electrodes 51 and 51. Thereafter, between the electrodes 51 and 51, a material as a resistance element, is printed and baked to form the generated strain measuring resistance element 52. Finally, the protective film 53 is formed for protecting the electrodes 51 and 51 and the strain measuring resistance element 52.

Where the sensor is so formed in the manner as hereinabove described, no reduction in adhesion strength due to aged deterioration, which is often observed when a bonding agent is used to fixedly mount on a sensor mounting surface of the strain generating member 21, may be avoided and the reliability of the sensor unit 20 can be increased. Also, the processing is each to achieve and, hence, the cost can be reduced.

When the load acts between the vehicle wheel tire and the road surface, the load is applied also to the outer member 1, which is the stationary member of the wheel support bearing assembly. If the sensor units 20 of the sensor unit pair 19 are mounted on, for example, the projecting pieces 1aa of the vehicle body fitting flange 1a and an attempt is made to calculate the load from deformation of the vehicle body fitting flange 1a, the hysteresis appears in the output signal as is the case with that described in connection with the related art. However, since in this instance the two contact fixing segments 21a of the strain generating member 21 in the sensor unit 20 are fixed to the outer diametric surface of the outer member in contact therewith and particularly since the strain generating member 21 is prepared from a thin plate material, the strain induced in the outer member 1 can be easily transmitted, after having been amplified, to the strain generating member 21, that strain can be detected by the sensor with high accuracy, the hysteresis appearing in the output signal therefrom is reduced, and the load can therefore be calculated accurately. Also, since the strain generating member 21 is prepared from the thin plate material, the shape of the strain generating member 21 can be simplified, resulting in an excellent mass productivity. Where the strain generating member 21 is in the form of a strip of an approximate top plane shape having a constant width over the entire length thereof, the shape can further be simplified, resulting in an excellent mass productivity. Also, if the strain generating member 21 is made to have the cutout portion 21b defined in each of the opposite side edge portions while representing a strip shape in an approximate top plane shape as shown in FIG. 3, the strain induced in the outer member 1 is further amplified and then transmitted to the strain generating member 21 and, therefore, the load can be calculated further highly accurately.

It is to be noted that although in describing each of the previously described embodiments of the present invention and also in each of the previously described applied examples of the present invention, the outer member 1 has been shown and described serving as the stationary member, the present invention can be equally applied to the wheel support bearing assembly, in which the inner member serves as the stationary member and, in such case, the sensor unit 20 has to be provided on an peripheral surface, which forms an inner periphery of the inner member.

Also, although in describing each of the previously described embodiments of the present invention, reference has been made to the wheel support bearing assembly of a third generation type, the present invention can also be equally applied to the wheel support bearing assembly of a first or second generation type, in which the bearing unit and the hub unit are members separate from each other, and to the wheel support bearing assembly of a fourth generation type, in which a part of the inner member is constituted by an outer ring of a constant velocity joint. In addition, the sensor-equipped wheel support bearing assembly can further be applied to the wheel support bearing assembly for the support of a vehicle driven wheel and to the wheel support bearing assembly of a tapered roller bearing design of any of the generation types.

Each of the previously described first to third applied examples encompasses the following modes:

[Mode 1]

A sensor-equipped wheel support bearing assembly including an outer member having an inner periphery formed with a plurality of rolling surfaces, an inner member having an outer periphery formed with rolling surfaces in face-to-face relation with the first mentioned rolling surfaces, and a plurality of rows of rolling elements interposed between the respective rolling surfaces in the outer and inner member, and designed to rotatably support a vehicle wheel relative to a vehicle body structure:

in which the sensor unit, including a strain generating member and a strain measuring sensor fitted to the strain generating member, is provided in the stationary member which is one of the outer and inner members, and the strain generating member is prepared from a thin plate material including two contact fixing segments adapted to be fixed to an outer diametric surface of the stationary member in contact therewith.

[Mode 2]

In the Mode 1 above, the strain generating member has an approximate top plane shape representing a strip shape having a constant width over the entire length thereof.

[Mode 3]

In the Mode 1 above, the strain generating member has an approximate top plane shape representing a strip shape and has a cutout portion defined in a side portion thereof.

[Mode 4]

In the Mode 1 above, the sensor unit is so arranged that the two contact fixing segments of the strain generating member may assume respective the same axial positions of the stationary member and respective positions spaced from each other in a direction circumferentially thereof

[Mode 5]

In the Mode 4 above, the stationary member has an outer periphery formed with a vehicle body fitting flange adapted to be fitted to a knuckle and also has a bolt hole provided at a plurality of circumferential locations of the vehicle body fitting flange while a peripheral portion of the vehicle body fitting flange, where the corresponding bolt hole is provided, protrudes radially outwardly beyond any other portion thereof to define a projecting piece and those two contact fixing segments of the strain generating member are arranged intermediate between the neighboring projecting pieces.

[Mode 6]

In the Mode 5 above, the space between the two contact fixing segments is equal to or smaller than ½ of the space between the neighboring projecting pieces.

[Mode 7]

In the Mode 1 above, the sensor unit is arranged at an axial position, which is in a periphery of an outboard one of the plurality of the rolling surfaces.

[Mode 8]

In the Mode 1 above, the strain generating member of the sensor unit is of a kind which does not undergo any plastic deformation even in a condition, in which as a force acting on the stationary member or a working force acting between a vehicle wheel tire and the road surface, the maximum expected force is applied.

[Mode 9]

In the Mode 1 above, the sensor is formed by forming an insulating layer on a sensor mounting surface area of the strain generating member by means of printing and baking, followed by printing and baking an electrode and a strain measuring resistance element over the insulating layer.

[Mode 10]

In the Mode 1 above, the two contact fixing segments of the strain generating member are fixed to the outer diametric surface of the stationary member through respective spacers.

[Mode 11]

In the Mode 1 above, a groove is formed intermediate between respective positions of the outer diametric surface of the strain generating member, at which the two contact fixing segments of the sensor unit are fixed.

[Mode 12]

In the Mode 1 above, the outer diametric surface of the stationary member is provided at least one sensor unit pair comprised of the two sensor units arranged at respective positions spaced 180° in a phase difference from each other in a direction circumferentially of the stationary member.

[Mode 13]

In the Mode 1 above, a calculating section is provided for calculating a load from at least one of the absolute value of the output signal of the sensor, the average value of such output signal and the amplitude of such output signal.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor-equipped wheel support bearing assembly, for rotatably supporting a vehicle wheel relative to a vehicle body structure, comprising:
an outer member having an inner periphery formed with a plurality of rolling surfaces;
an inner member having an outer periphery formed with rolling surfaces in face-to-face relation with the rolling surfaces in the outer member;
a plurality of rows of rolling elements interposed between the respective rolling surfaces in the outer and inner members; and
at least one sensor unit including a strain generating member, having two or more contact fixing segments fixed to one of the outer member and the inner member that serves as a stationary member, in contact therewith, and a sensor fitted to the strain generating member for detecting a strain induced in the strain generating member,
wherein the strain generating member has a cutout portion positioned intermediate between the contact fixing segments and having an arcuately sectioned shape only in a corner area.

2. The sensor-equipped wheel support bearing assembly as claimed in claim 1, wherein the strain generating member is prepared of a plate material of a generally strip shape in a plain view and having the cutout portion defined at a side edge portion thereof.

3. The sensor-equipped wheel support bearing assembly as claimed in claim 1, wherein the sensor unit is so arranged on an outer diametric surface of the stationary member that the two contact fixing segments of the strain generating member assume the same axial positions of the stationary member and respective positions spaced from each other in a direction circumferentially thereof.

4. The sensor-equipped wheel support bearing assembly as claimed in claim 3, wherein the contact fixing segments of the strain generating member are fixed to the outer diametric surface of the stationary member through respective spacers.

5. The sensor-equipped wheel support bearing assembly as claimed in claim 3, wherein the strain generating member has a groove formed intermediate between respective positions on the outer diametric surface thereof, at which the two contact fixing segments of the sensor unit are fixed.

6. The sensor-equipped wheel support bearing assembly as claimed in claim 1, wherein the sensor unit is so arranged on an outer diametric surface of the stationary member that the two contact fixing segments of the strain generating member assume the same circumferential positions of the stationary member and respective positions spaced from each other in a direction axially thereof.

7. The sensor-equipped wheel support bearing assembly as claimed in claim 1, wherein the stationary member has an outer periphery formed with a vehicle body fitting flange adapted to be fitted to a knuckle and having a plurality of bolt holes defined at respective circumferential locations thereof and also having projecting pieces, provided in the circumferential locations at which the bolt holes are defined, protruding radially outwardly from the remaining portion of such flange, and wherein the two contact fixing segments of the strain generating member are arranged intermediate between the neighboring projecting pieces.

8. The sensor-equipped wheel support bearing assembly as claimed in claim 1, wherein the sensor unit is arranged at an axial position, which is in a periphery of one of the plurality of the rolling surfaces that is located on an outboard side.

9. The sensor-equipped wheel support bearing assembly as claimed in claim 1, wherein the outer diametric surface of the stationary member is provided with at least one sensor unit pair comprised of the two sensor units arranged at respective positions spaced 180° in a phase difference from each other in a direction circumferentially of the stationary member.

10. The sensor-equipped wheel support bearing assembly as claimed in claim 1, wherein the strain generating member is formed with the cutout portions in opposite side edges of the strain generating member, respectively, and the sensor is fitted to an intermediate portion on an outer surface side of the strain generating member, formed between the cutout portions in the opposite side edges.

* * * * *